United States Patent
Zambetti et al.

(10) Patent No.: US 8,400,132 B2
(45) Date of Patent: *Mar. 19, 2013

(54) METHOD OF SWITCHING A PWM MULTI-PHASE VOLTAGE CONVERTER

(75) Inventors: Osvaldo Enrico Zambetti, Milan (IT); Daniele Giorgetti, Corbetta (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,896

(22) Filed: Aug. 22, 2012

(65) Prior Publication Data
US 2012/0313605 A1      Dec. 13, 2012

Related U.S. Application Data

(63) Continuation of application No. 12/797,212, filed on Jun. 9, 2010, now Pat. No. 8,258,769.

(30) Foreign Application Priority Data

Jun. 10, 2009   (IT) .............................. VA2009A0034

(51) Int. Cl.
*G05F 1/40*      (2006.01)
*G05F 1/44*      (2006.01)
*G05F 1/56*      (2006.01)

(52) U.S. Cl. ........ 323/284; 323/282; 323/285; 323/288; 323/222; 323/223; 323/224

(58) Field of Classification Search ................... 323/282, 323/284, 285, 288, 222, 223, 224
See application file for complete search history.

(56) References Cited

U.S. PATENT DOCUMENTS

| | | | |
|---|---|---|---|
| 6,597,603 | B2 | 7/2003 | Lambrache et al. |
| 6,803,750 | B2 | 10/2004 | Zhang |
| 6,912,144 | B1 | 6/2005 | Clavette |
| 7,023,182 | B1 | 4/2006 | Kleine et al. |
| 7,026,798 | B2 | 4/2006 | Cheung et al. |
| 7,109,691 | B2 | 9/2006 | Brooks et al. |
| 7,816,901 | B2 | 10/2010 | Wu et al. |
| 2003/0090940 | A1 | 5/2003 | Lamrache et al. |
| 2007/0013350 | A1 | 1/2007 | Tang et al. |
| 2008/0094049 | A1 | 4/2008 | Wu et al. |
| 2008/0272752 | A1 | 11/2008 | Qiu et al. |
| 2008/0303495 | A1 | 12/2008 | Wei et al. |
| 2010/0315057 | A1 | 12/2010 | Zambetti |

FOREIGN PATENT DOCUMENTS

EP      1513247      3/2005

*Primary Examiner* — Bao Q Vu
(74) *Attorney, Agent, or Firm* — Allen, Dyer, Doppelt, Milbrath & Gilchrist, P.A.

(57) ABSTRACT

A circuit may generate a clock signal with a variable period given by a ratio between an initial switching period and a number of phase circuits through which a current of a multi-phase PWM voltage converter flows. The circuit may include an adjustable current generator driven by a signal representing the number of phase circuits through which the current flows and configured to generate a current proportional to the number of phase circuits through which the current flows, and a tank capacitor charged by the adjustable current generator. The circuit may include a comparator of a voltage on the tank capacitor with a threshold value configured to generate a pulse of the clock signal when the threshold value is attained, and a discharge path of the tank capacitor, the discharge path being enabled during the pulses of the clock signal.

19 Claims, 18 Drawing Sheets

METHOD OF SWITCHING A PWM MULTI-PHASE VOLTAGE CONVERTER

RELATED APPLICATIONS

This application is a continuation of Ser. No. 12/797,212 filed Jun. 9, 2010, now U.S. Pat. No. 8,258,769 issued Sep. 4, 2012, the entire disclosure of which is hereby incorporated herein by reference.

FIELD OF THE DISCLOSURE

This present disclosure relates in general to voltage converters, and more particularly, to a method of switching a pulse width modulated (PWM) multi-phase voltage converter between multiple functioning conditions.

BACKGROUND

FIG. 1 depicts a block diagram of a typical buck converter with N phases and FIG. 2 illustrates the yield of a four-phase buck converter, i.e. of the output current and of the number of active phases (PH). For this reason, multi-phase voltage converters are controlled to adapt the number of active phases to the external load conditions, by reducing or increasing the number of phases depending on the current being delivered by the converter.

A problem tied to the reduction of the number of functioning phase circuits is to reduce as much as possible the undershoot of the output voltage during these transitions. In order to understand what causes the undershoot of the output voltage, reference is made to FIG. 3 that illustrates an exemplary transition from three active phases to one active phase circuit. $I_{L1}$, $I_{L2}$ and $I_{L3}$ represent the currents through the inductors, $I_{OUT}$ represents the sum of the currents through the inductors (the dashed part indicates the ideal $I_{OUT}$ during the transition), and $I_{LOAD}$ represents the current used by the load and PS (Power Saving) a signal that enables the reduction of the number of active phase circuits.

As far as PS=0, the output sum current $I_{OUT}$ has an "updating" frequency equal to $N*F_{SW}$, wherein $F_{SW}$ represents the switching frequency of the single stage and N represents the number of phases of the system. In particular, during each $I_{OUT}$ cycle, equal to $T_{SW}/N$, wherein $T_{SW}$ is the switching period of a single phase circuit, it is possible to identify a charge time during which there is always at least a phase circuit that is on and the other phase circuits are off, and a discharge time during which the other two phase circuits are off. When PS=1 (instant $t_0$), the phase circuits that may be turned off could be driven with a null duty-cycle (the low side MOS is on), as far as the respective phase currents cancel out (instants $t_2$ and $t_3$, respectively).

During the interval $t_0$-$t_2$, when the phase current $I_{L3}$ is canceled and the phase current IL1 is not yet in a steady-state condition, the equivalent switching frequency $F_{EQ}$ on the output current $I_{OUT}$ reduces (in this case $F_{EQ}=3*F_{SW}$) compared to the frequency that was present when the signal PS was logically low. This results in a drop of the equivalent output current $I_{OUT}$ compared to that requested by the load $I_{LOAD}$. The area $Q_T$ represents the charge lost by the output filter $C_{OUT}$ during the transition that causes the voltage drop, which may depend on the output capacitance being used.

During the interval $t_2$-$t_3$, when the phase current IL2 is canceled out, the nominal equivalent switching frequency of a converter with two active phases and one phase off, i.e. $F_{EQ}=2*F_{SW}$, is not attained, thus causing a further charge loss on the output filter. When the phase current IL2 becomes null (instant $t_3$), the equivalent frequency is $F_{SW}$, i.e. the frequency of a converter with a single active phase circuit (mono-phase). The consequent drop of the output voltage becomes more relevant and the converter may compensate it in a slower or faster way depending on the bandwidth of the single phase circuit.

It may be important to eliminate, or at least limit, the output voltage undershoot during those transitions for not disturbing the functioning of the voltage control loop of the converter that intervenes for compensating the disruption. The greater the load current during the transition, the larger the current drop $I_{OUT}$. FIG. 4 illustrates a transition from three phases to one phase in low load conditions. Differently from the example of FIG. 3, the lost charge $Q_T$ during the transition is smaller than in the previous case because the currents through the phase circuits to be turned off are almost null.

Sometimes, for simplifying the design, the phases to be turned off are set to a high impedance state as soon as PS=1. In this case, the currents are discharged with a larger slew rate because the free-wheeling diode of the low side MOS of the phase is turned on. As a result, additional charge is lost from the output filter capacitance, as shown in FIG. 5, wherein the dashed parts indicate the transition shown in FIG. 3, with the low side MOS turned on. This approach, besides generating a large undershoot of the output voltage, causes a loss of efficiency of the converter under medium load conditions and in case of switching to and resuming from a power saving mode because, while turning off the phases, the free-wheeling diodes of low side MOS switch on, thus dissipating power.

According to another typical technique, illustrated in FIG. 3, the low side MOS of the phases to be turned off is kept on until the current nullifies or reaches a pre-established threshold. This approach may be better than the previous one from the point of view of power dissipation, but implies a significant drop of the output voltage. A feedback voltage converter, a block diagram of which is depicted in FIG. 6, is illustrated in the published U.S. Patent Application Publication No. 2008/0272752 to Qiu et al. FIG. 7 illustrates an exemplary time diagram of the converter of FIG. 6 in the case in which six phase circuits are present. The signal PSI# is the logic switching signal, P1, P2, . . . , P6 are the enabling signals of the respective phase circuits. In the last figure, there are two extra pulses that are added in correspondence of the enable pulse of the phase circuit 4 to sustain the output and to speed up the phase dropping transient. The equivalent frequency of the converter during the transition is twice the nominal frequency of the phase current IL1 when the phase current IL2 is not null as well as when the phase circuit is in a high impedance state with a null current (the phase circuit IL2 is off).

FIG. 8 illustrates a transition from six active phase circuits to two active phase circuits with a single pulse addition for each phase circuit. As shown, the two active phase circuits are not outphased by 180 degrees as it would be desirable in a two-phase converter. In the simulation illustrated in FIG. 9 of a three phase system, only a pulse is added because the output current is already low. The above-discussed prior patent publication is silent about the criterion used for determining the number of pulses to be added.

SUMMARY OF THE DISCLOSURE

An advantageous method of switching a multi-phase PWM converter from a functioning condition in which all N phase circuits are active to a functioning condition in which only m phase circuits are active and the other N-m phase circuits are deactivated has been found.

With the method, transition between the two functioning modes may be effected by leaving unchanged the equivalent frequency of the converter while letting the phase currents of the m phase circuits that remain active be uniformly out-phased between them.

This ideal condition of the converter may be achieved by adaptively making the switching period of the active phase circuits correspond to the product between the number m of phase circuits that remain active and the ratio between the initial switching period and the number of phase circuits during which a current flows, thus correspondingly reducing the respective off time, and then updating the switching period of the m phase circuits that remain active as the N-m phase circuits are switched off.

The updating of the switching period may be implemented by a circuit adapted to generate a clock signal of variable period. The circuit may comprise an adjustable current generator driven by a signal representing the number of phase circuit through which a current flows, adapted to generate a current proportional to this number, a tank capacitor charged by the adjustable current generator, and a comparator of the voltage on the tank capacitor with a threshold value, adapted to generate a pulse of the clock signal when the threshold value is attained. The circuit may further comprise a discharge path of the tank capacitor that is enabled during pulses of the clock signal. It is further disclosed a multi-phase PWM voltage converter that implements the herein disclosed method.

DETAILED DESCRIPTION OF THE PREFERRED EMBODIMENTS

In order to better illustrate the disclosed embodiments, reference may be made to the case of an N-phase voltage converter that switches from a functioning condition with N active phase circuits to another functioning condition in which only one phase circuit is on. Successively, a way of generalizing the proposed method to the switching of N active phase circuits to in active phase circuits may be shown.

In a N-phase voltage converter, when switching from a functioning condition with N on phase circuits to a functioning condition with a single active phase circuit, the current through the active phase circuit may increase from $I_{OUT}/N$ to $I_{OUT}$, being $I_{OUT}$ the current to be delivered, with an increment of $(N-1)*I_{OUT}/N$. During this transition phase, it may be necessary to reduce system perturbation to a minimum. Normally, at each interval of duration $T_{SW}/N$ (being $T_{SW}$ the switching period of the PWM driving signals), only a phase circuit at the time is energized.

When a phase circuit is to be turned off, the duty-cycle of the respective PWM driving signal is nullified thus leaving on the respective low side MOS. While the phase circuits are turned off and when none of the phase currents has attained a turn-off level below which the phase circuit may be turned off, it is advisable to keep the same switching frequency of the converter and the same equivalent on time $T_{ON}$ for not reducing the output current. For this reason, according to the method, the phase circuit 1 to be left active is driven with a switching frequency and a gain N times larger.

When a first phase current drops down to the turn-off level, that for example could be the zero current, the related phase circuit may be turned off. The number of phase circuits that are still active is reduced and the equivalent frequency and gain of the converter are reduced down to the values that they would have in an N−1 phase converter. Thus, the phase circuit 1 is driven with a frequency and a gain N−1 times larger than the nominal values of the phase circuit.

When another phase current decreases down to the off level, the related phase circuit is turned off. The phase circuits off that do not contribute anymore to the output current are two, and thus according to the method the phase circuit 1 is driven with a frequency and a gain N−2 times the nominal values of the phase circuit. This procedure is repeated until all N−1 phase circuits to be turned off are inactive. In this case, the sole non-null phase current may be that of the phase circuit 1, that may be driven with a switching frequency and a gain equal to the nominal values.

Figure 1:
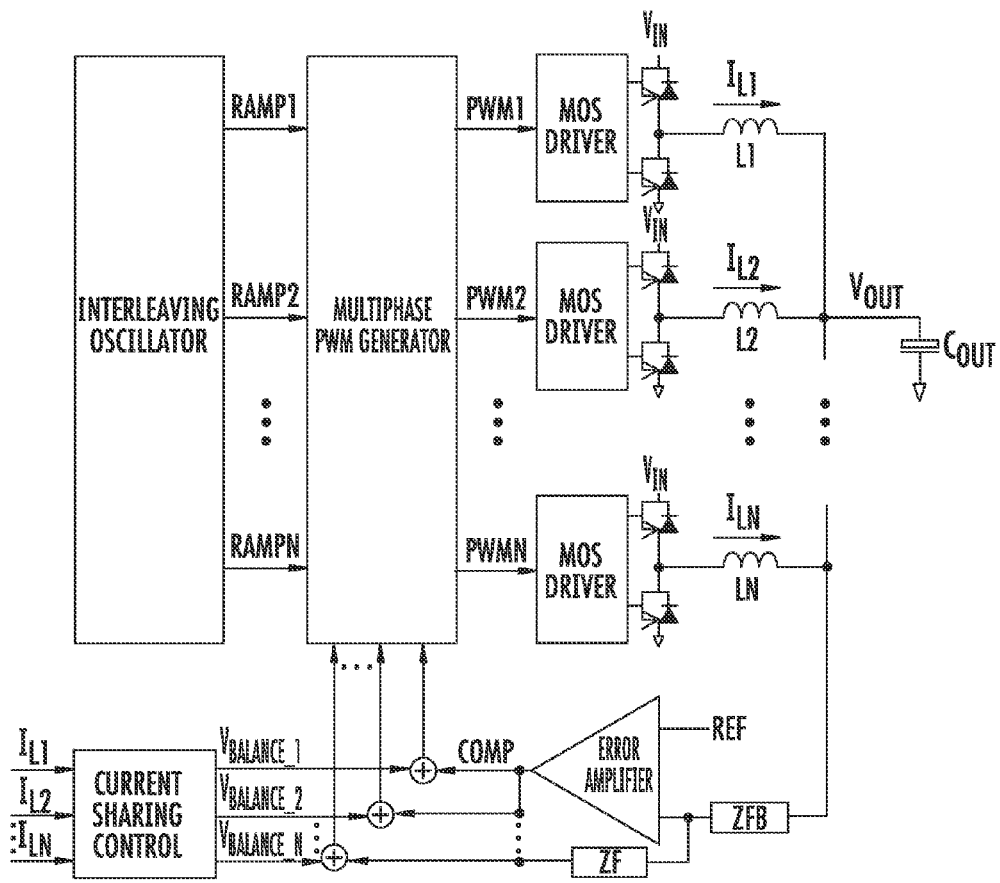
FIG. 1 is a block diagram of a buck multi-phase PWM voltage converter, according to the prior art.
Figure 2:
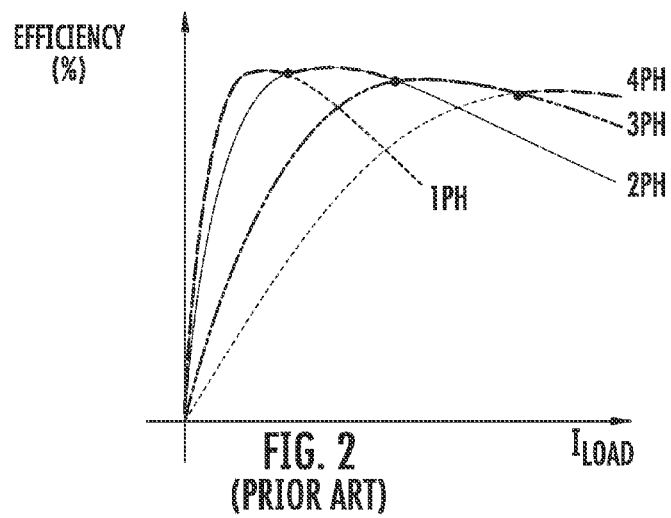
FIG. 2 is an exemplary graph of the yield of the converter of FIG. 1 in function of the load supplied current $I_{LOAD}$ of the number of PH active phases.
Figure 3:
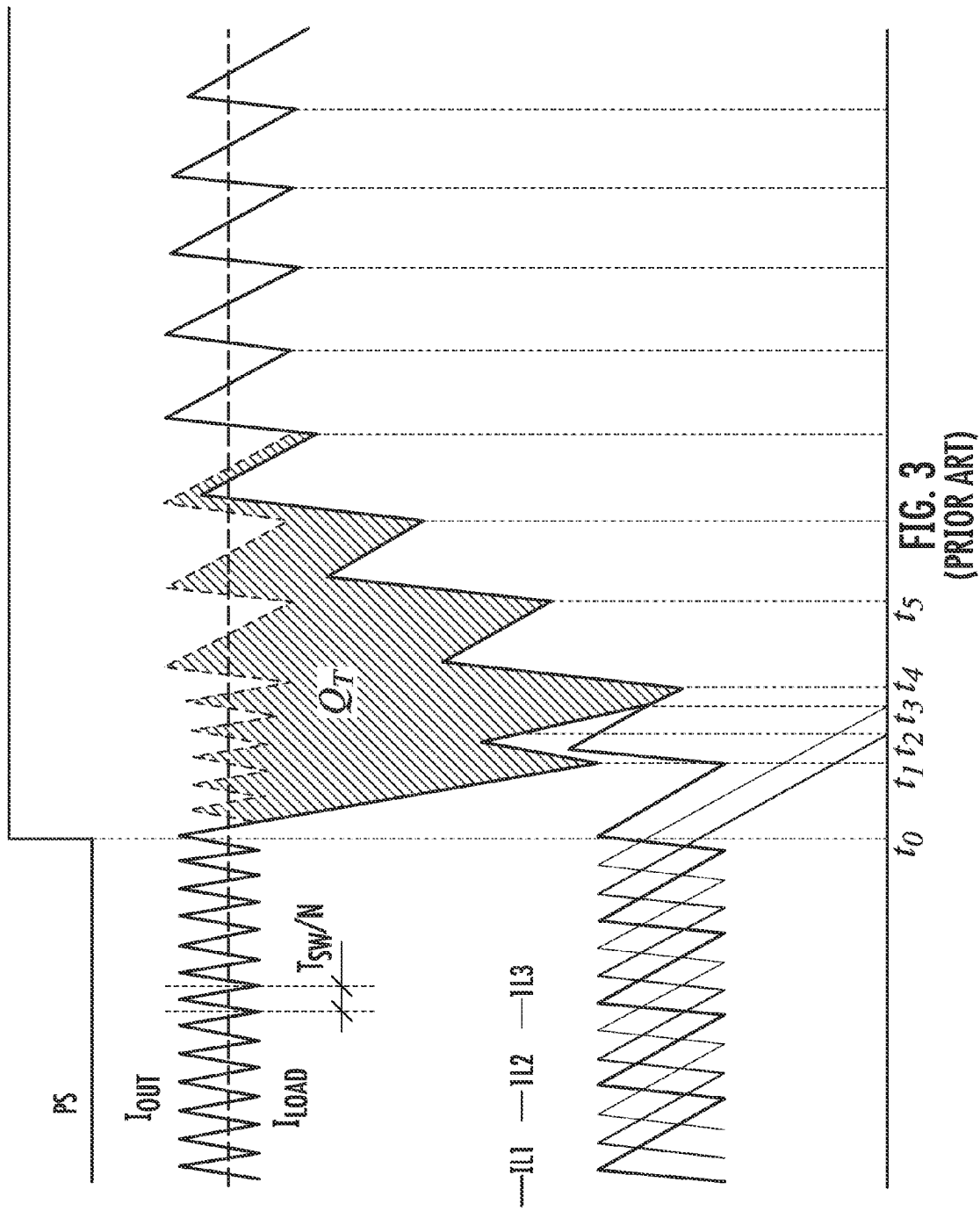
FIG. 3 is a graph of the main signals of the converter of FIG. 1 in the case of switching from three active phase circuits to a single active phase circuit with high load using a prior art technique.
Figure 4:
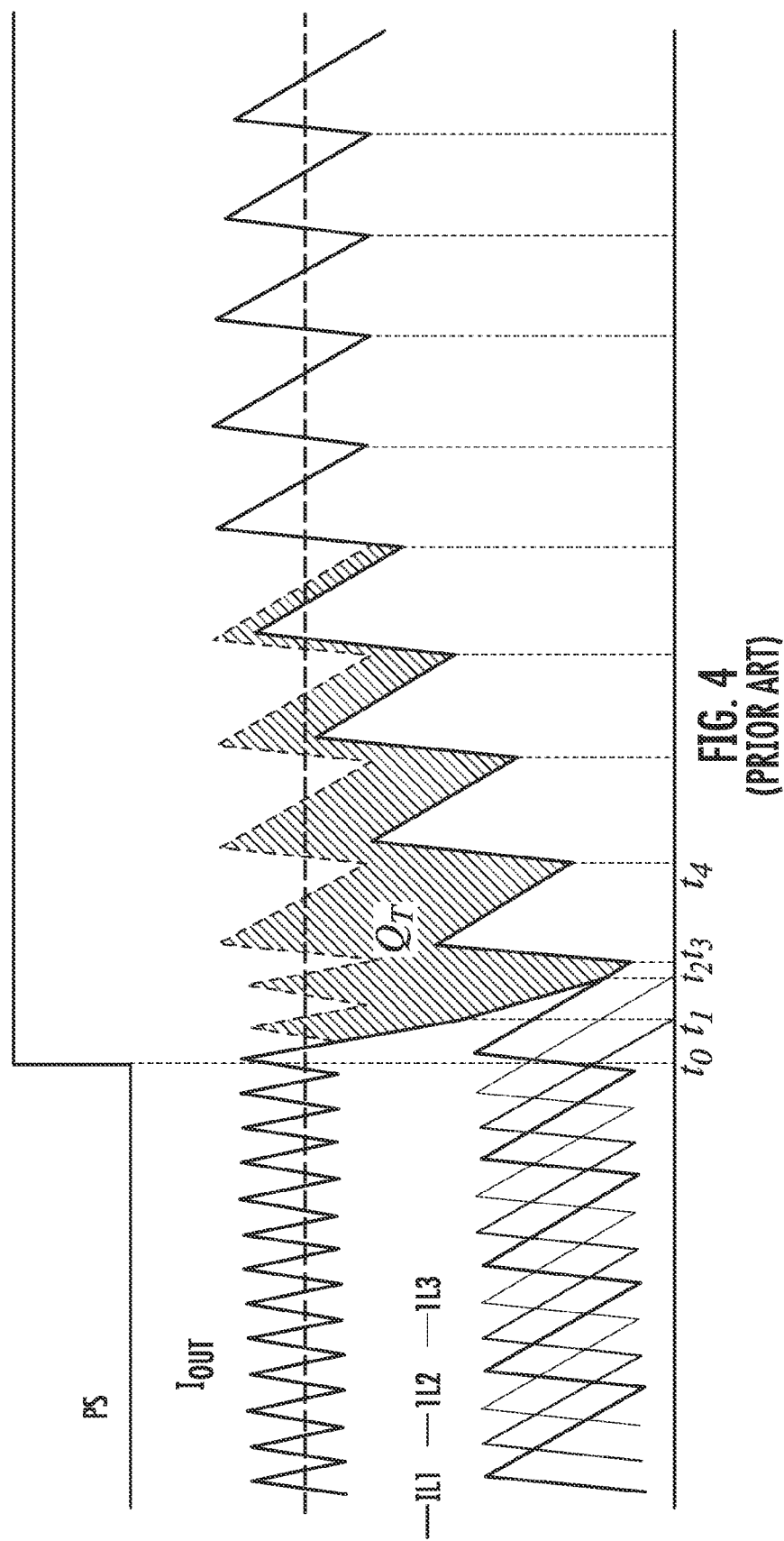
FIG. 4 is another graph of the main signals of the converter of FIG. 1 in the case of switching from three active phase circuits to a single active phase circuit in low load conditions using a prior art technique.
Figure 5:
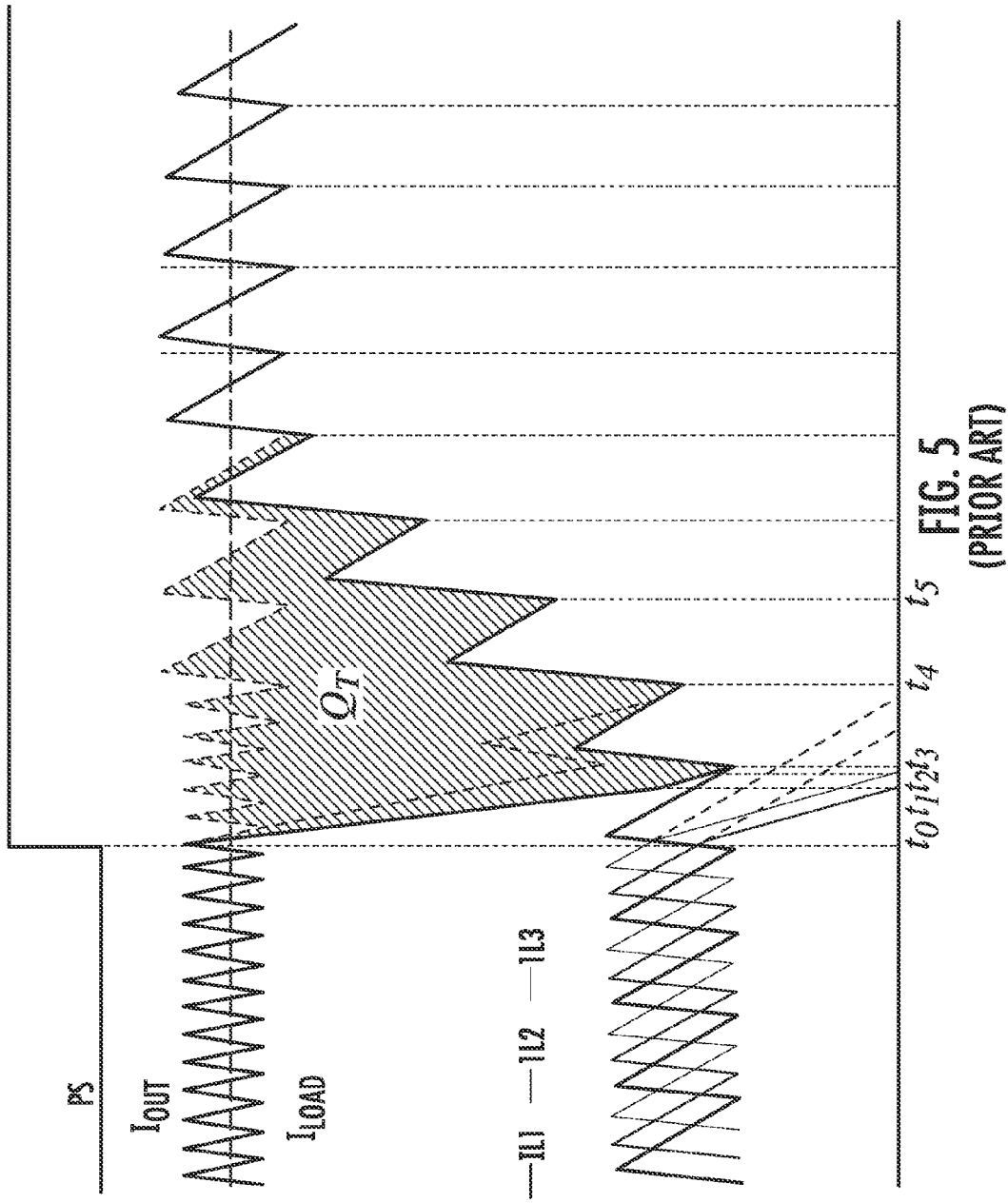
FIG. 5 is a graph of the main signals of the converter of FIG. 1 in the case of switching from three active phase circuits to a single active phase circuit in high load condition using a prior art technique.
Figure 6:
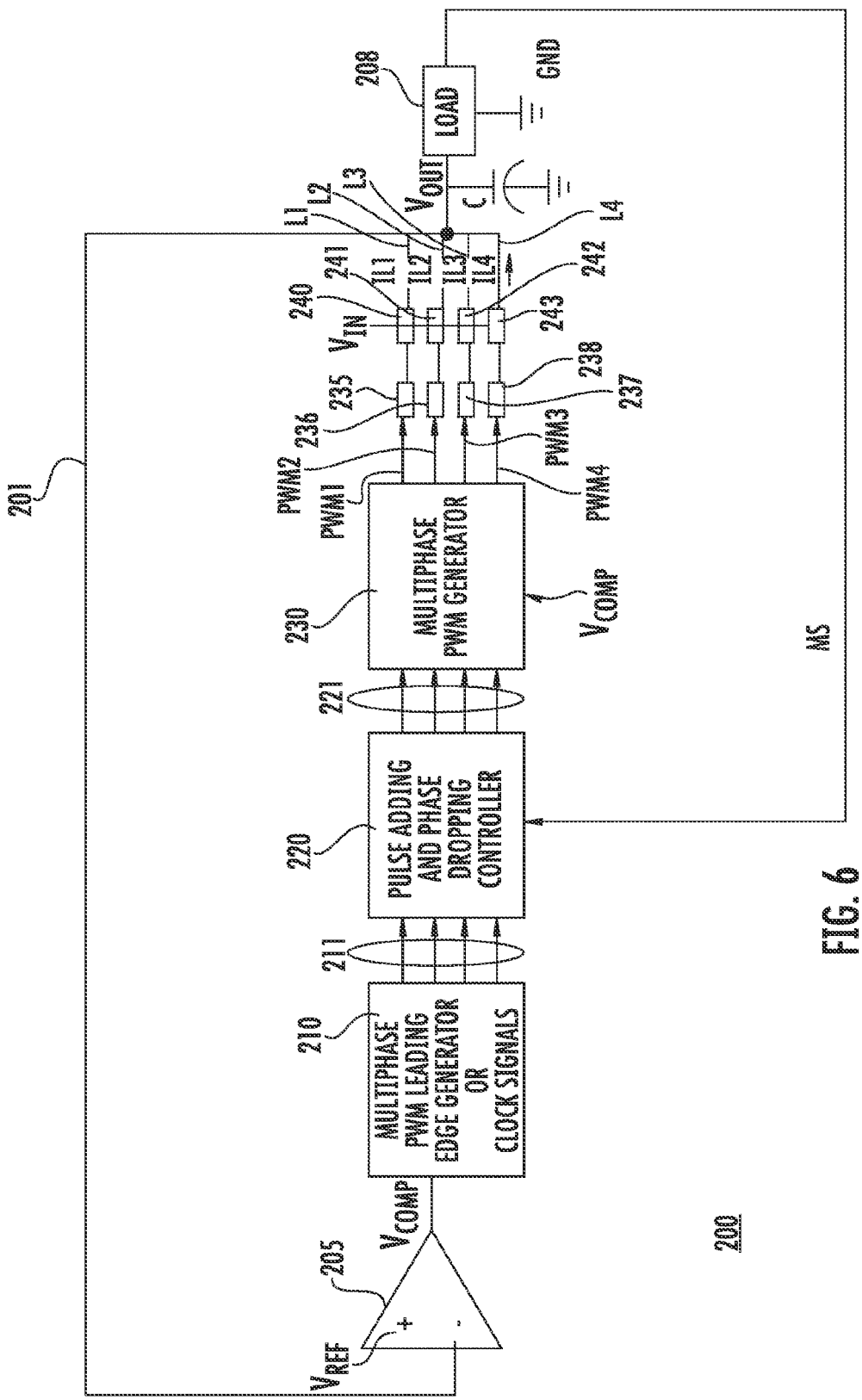
FIG. 6 depicts a voltage regulator disclosed in the published U.S. Patent Application Publication No. 2008/0272752.
Figure 7:
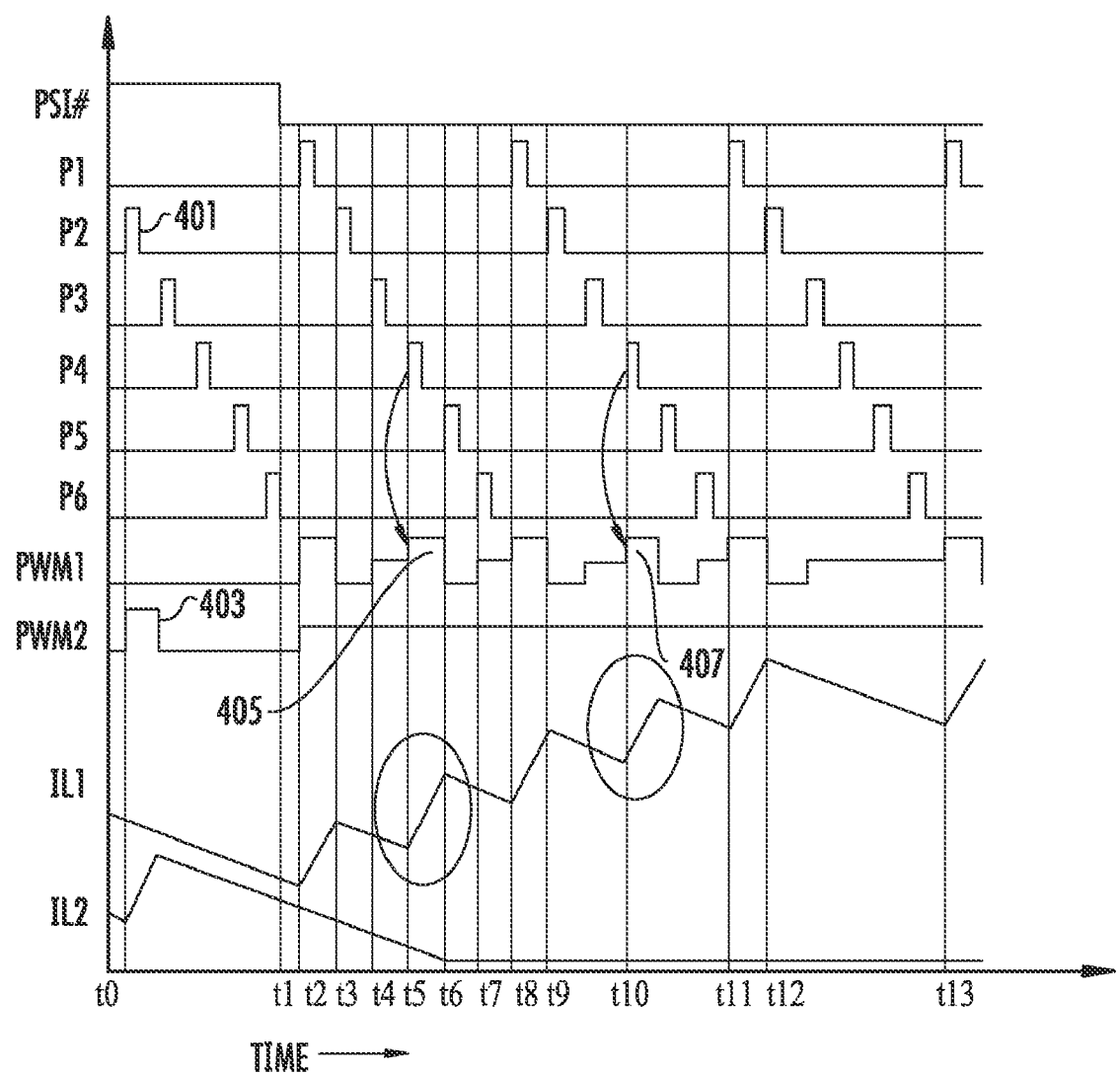
FIG. 7 is a time graph of the main signals of the regulator of FIG. 6 in the case of switching from a functioning condition in which only a phase circuit is active.
Figure 8:
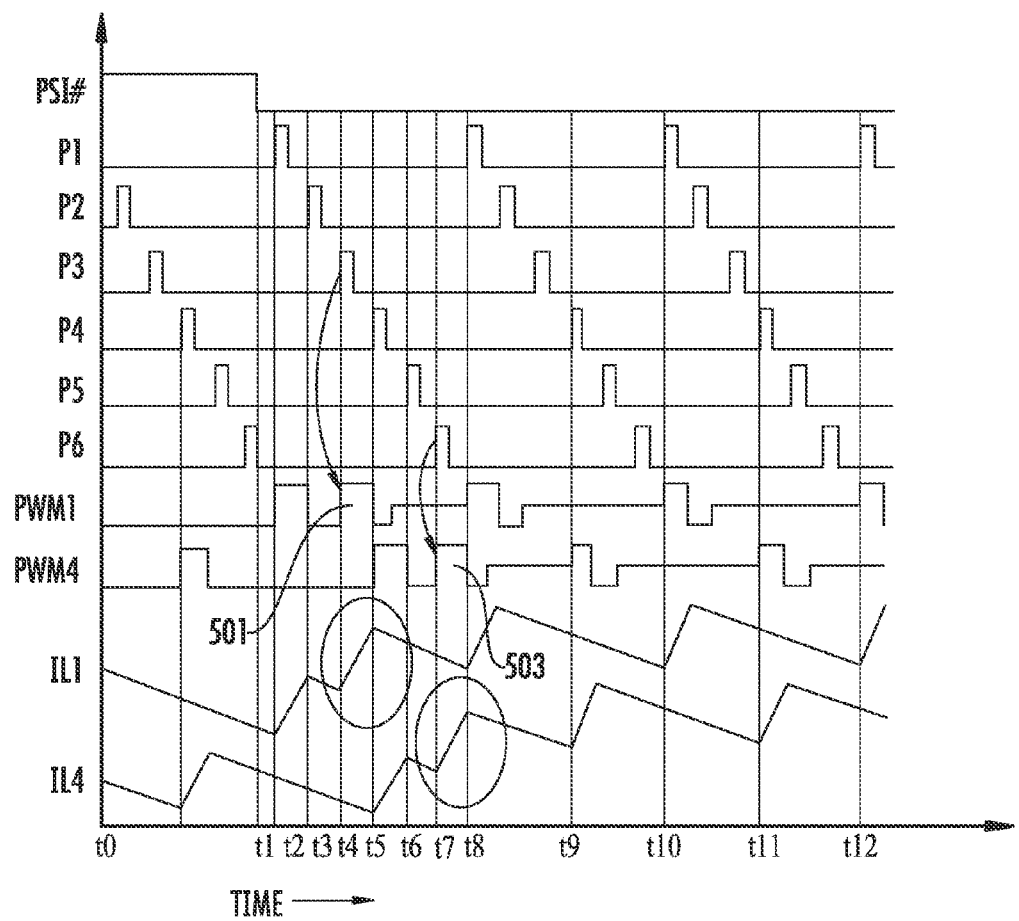
FIG. 8 is a time graph of the main signals of the regulator of FIG. 6 in the case of switching from a functioning condition in which two phase circuits are active.
Figure 9:
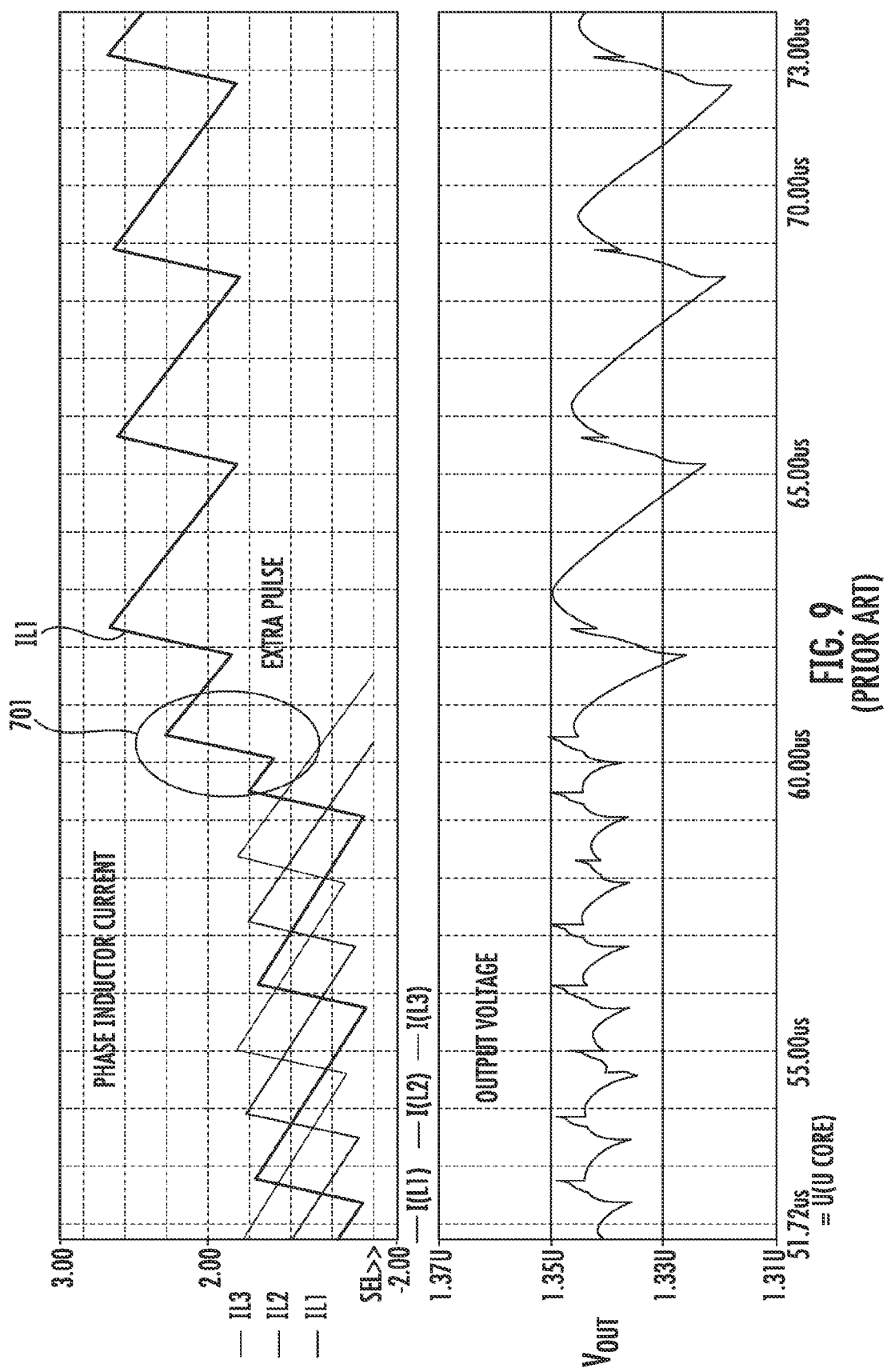
FIG. 9 is a time graph of the main signals of the three-phase voltage regulator of FIG. 6 in the case of switching from a functioning condition in which only a phase circuit is active, in which the addition of an extra driving pulse is highlighted when all the phase circuits are active.
Figure 10:
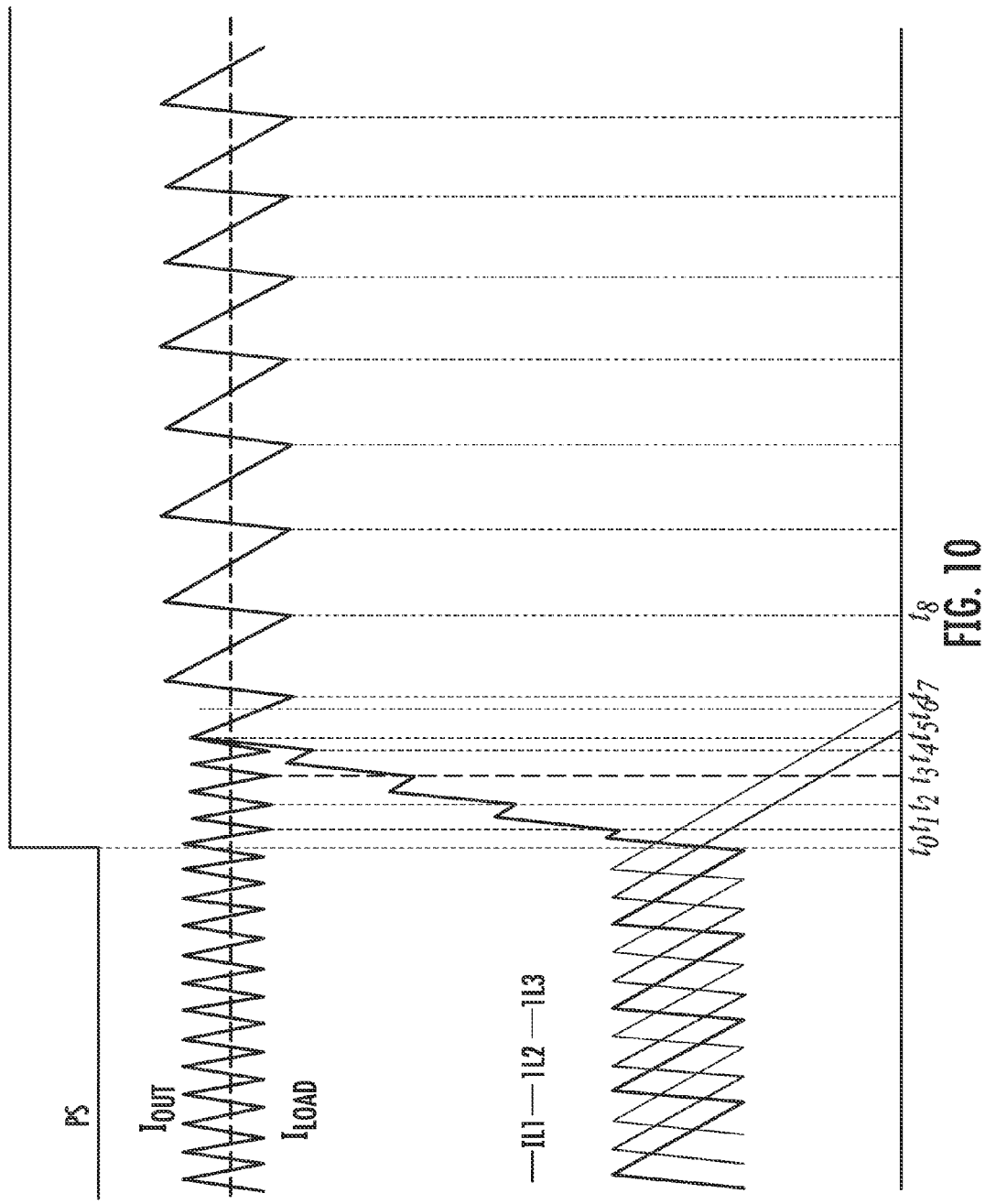
FIG. 10 is a graph of the waveforms of the phase currents in a three-phase converter switched according to the method of the present disclosure in high load conditions.

FIG. 10 illustrates the just described turn off procedure for a three-phase converter two phase circuits of which are to be turned off and only one phase circuit is to be left active. From the instant $t_0$, when the signal PS switches high, the phase circuits 2 and 3 may be driven with a null duty cycle (that is the respective low side MOS remain on) as far as the respective phase currents do not attain the turn off level that, in the case exemplified in the figure, is the zero current. In the instants $t_5$ and $t_6$, respectively, the phase circuit 2 and the phase circuit 3 are set in a high impedance state.

From the instant $t_0$ to the instant $t_5$, the phase circuit 1 is driven with a frequency three times larger than the nominal switching frequency of the phase circuit and a triple gain, in order to sustain the output voltage without modifying the on time $T_{ON}$. From the instant $t_5$ onwards, the phase circuit 2 may not give any contribution to the total output current, thus in the time interval from $t_5$ to $t_6$ the phase circuit 1 may be driven with a frequency and gain equal to those of a two-phase converter. From the instant $t_6$ onwards also, the phase circuit 3 may be off and the phase circuit 1 may be driven with its nominal frequency and gain.

Figure 11:
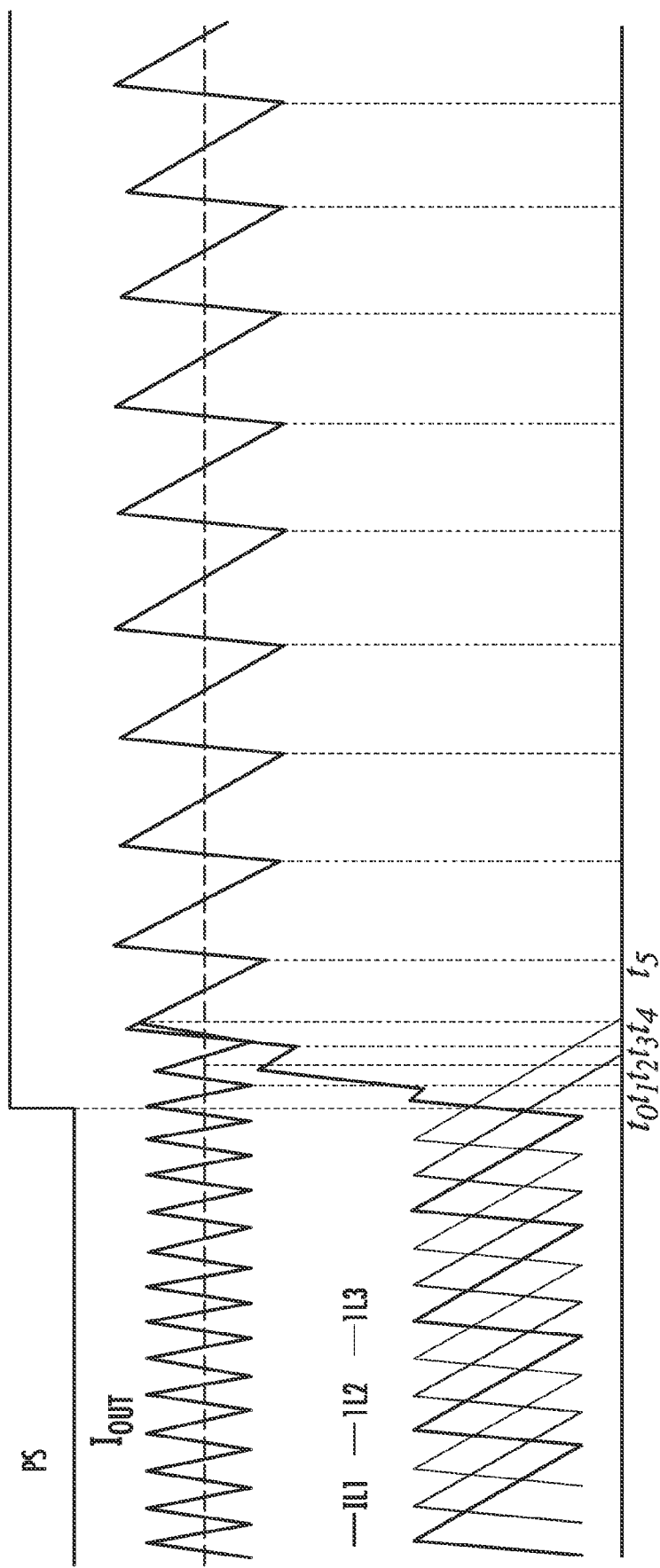
FIG. 11 is a graph of the waveforms of the phase currents in a three-phase converter switched according to the method, according to the present disclosure, in low load conditions.

FIG. 11 shows another example in which the current used by the load is relatively low. In this case, the duration of the transition is reduced. In order to better understand what happens with the method when a phase circuit is switched off, let us consider a two-phase converter and the transition illustrated in FIG. 13 from 2 on phase circuits to a single active phase circuit.

Before the signal PS switches high, thus driving the nullification of the duty cycle of the phase to be turned off, the equivalent switching frequency of the converter is $2*F_{SW}$, wherein $F_{SW}$ is the nominal switching frequency of a single phase circuit and the equivalent gain of the converter is $2*G_{PWM}$ wherein $G_{PWM}$ is the nominal PWM modulation gain of a single phase circuit.

When the signal PS switches high, the duty-cycle of the phase circuit 2 nullifies (the low side MOS is on) until its phase current becomes null, or until the turn off level is attained. In this time interval from the instant $t_1$ to the instant $t_4$, the phase circuit 1 may have a switching frequency and PWM gain double than the nominal values. By respecting this condition, in practice there is no voltage drop on the total output current (Iout) and thus of the output voltage.

In the period $t_5$, when the current through the phase circuit 2 attains the turn off level of the phase circuit, the total output current in the discharge portion may comprise the contributions of the phase currents 1 and 2, in the time interval $T_X$, and by the contribution of the sole phase current 1 in the remaining time interval. The current varies with a different slope, thus for sustaining the minimum level of delivered current and thus preventing excessive drop on the output voltage, the portion $t_5$ may necessarily last longer than the previous portions, such as, for example, of the portion $t_4$. In order to calculate by how much $t_5$ should last longer than $t_4$, it is sufficient to equal the respective ripple amplitudes of the output current, called $\Delta I_1$ for the period $t_4$ and $\Delta I_2$ for the period $t_5$.

Figure 12:
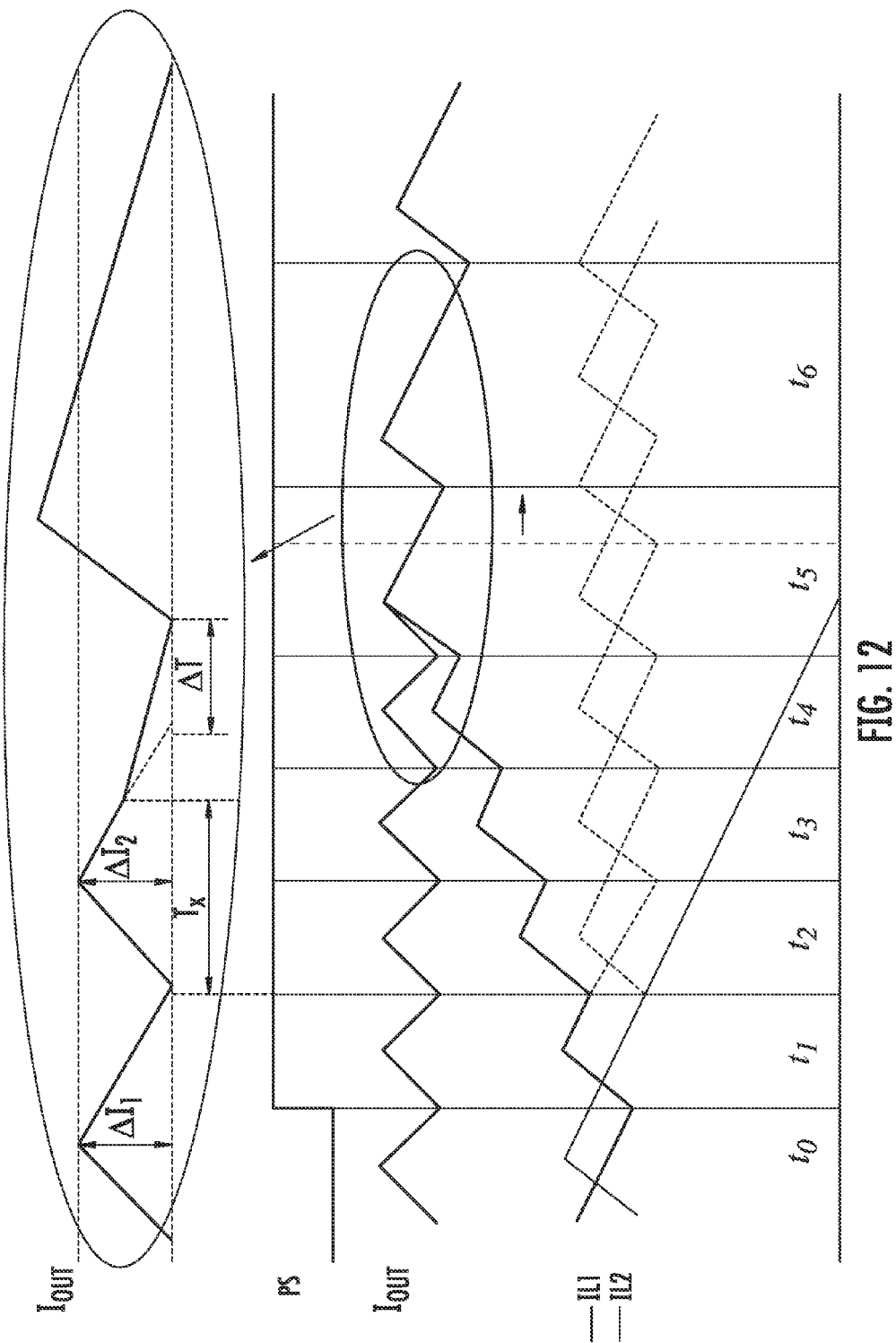
FIG. 12 is a time graph of the waveforms of the phase currents in a two-phase converter switched according to the method of the present disclosure.

For a two-phase system, the following equations hold:

$$\Delta I_1 = 2\frac{V_{OUT}}{L}\left(\frac{T_{SW}}{2} - DT_{SW}\right)$$

$$\Delta I_2 = 2\frac{V_{OUT}}{L}(T_X - DT_{SW}) + \frac{V_{OUT}}{L}\left(\frac{T_{SW}}{2} - T_X + \Delta T\right)$$

in which $V_{OUT}$ represents the regulated output voltage, L the value of the inductance in a phase circuit, D the duty-cycle, $T_{SW}$ the nominal switching period of a single phase circuit, and $T_X$ and $\Delta T$ the time intervals represented in FIG. 12.

In order to not reduce the output voltage, it should be that $\Delta I_1 = \Delta I_2$ holds, thus:

$$T_{SW}(1 - 2D) = 2T_X - 2DT_{SW} + \left(\frac{T_{SW}}{2} - T_X + \Delta T\right)$$

from which:

$$\Delta T = \frac{T_{SW}}{2} - T_X$$

The time to be added to the last period of the transition ($t_5$) is independent from the value of the inductances, of the voltage and of the output duty-cycle of the converter, but depends only on the nominal switching frequency, on the number of phase circuits and on the time $T_X$ used by the phase current to reach the turn off level (that in the shown example is 0 A). In general, it is possible to say that in a N-phase converter, the variation of the last period of the transition from N to N−1 phases is:

$$\Delta T = \frac{1}{N(N-1)}T_{SW} - \frac{1}{N-1}T_X$$

This time may be defined by generating a clock signal with a variable period to be used to reset the PWM ramps used for generating the PWM driving signals of the phases to be left active.

Figure 13:
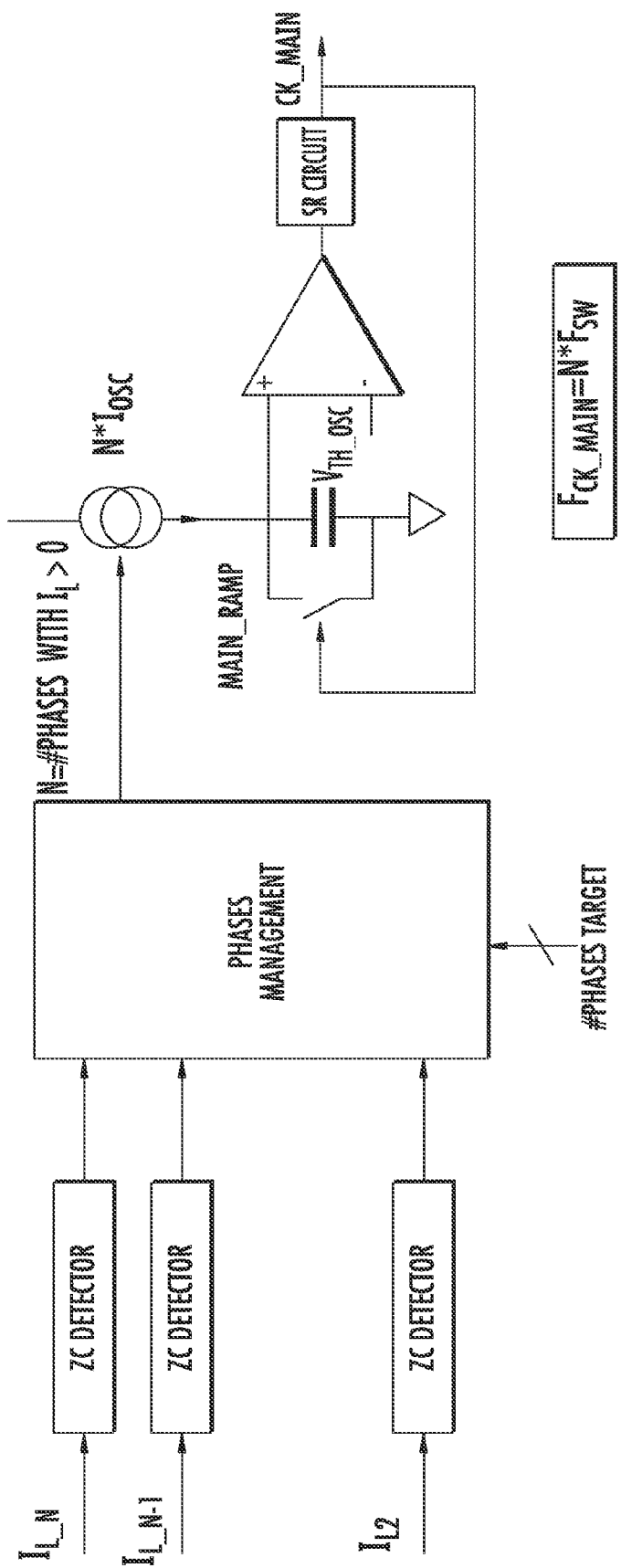
FIG. 13 illustrates a circuit for generating a clock signal with a variable period determined by the number of active phases in a multi-phase converter, according to the present disclosure.

FIG. 13 illustrates a main diagram of a circuit for generating a clock signal with a variable period to be used as a main oscillator of the voltage converter, having a frequency $N*F_{SW}$ wherein N represents the number of active phase circuits. In this scheme, the currents $I_{L2}, \ldots, I_{LN}$ are the currents through the phase circuits of the converter; this figure depicts also the zero-cross detection circuits of the currents (ZC DETECTOR), the block for managing the interleaving, the frequency and the number of phase circuits (PHASE MANAGEMENT), the current generator of the ramp of the main oscillator, a tank capacitor on which a voltage ramp is produced, a comparator of the voltage on the capacitor with a threshold $V_{TH\_OSC}$, and a circuit SR_CIRCUIT for generating clock pulses CK_MAIN, that is the main clock of the converter. From this clock signal, the timing signals interleaving between PWM driving signals of the single phase circuits may be generated.

Figure 14:
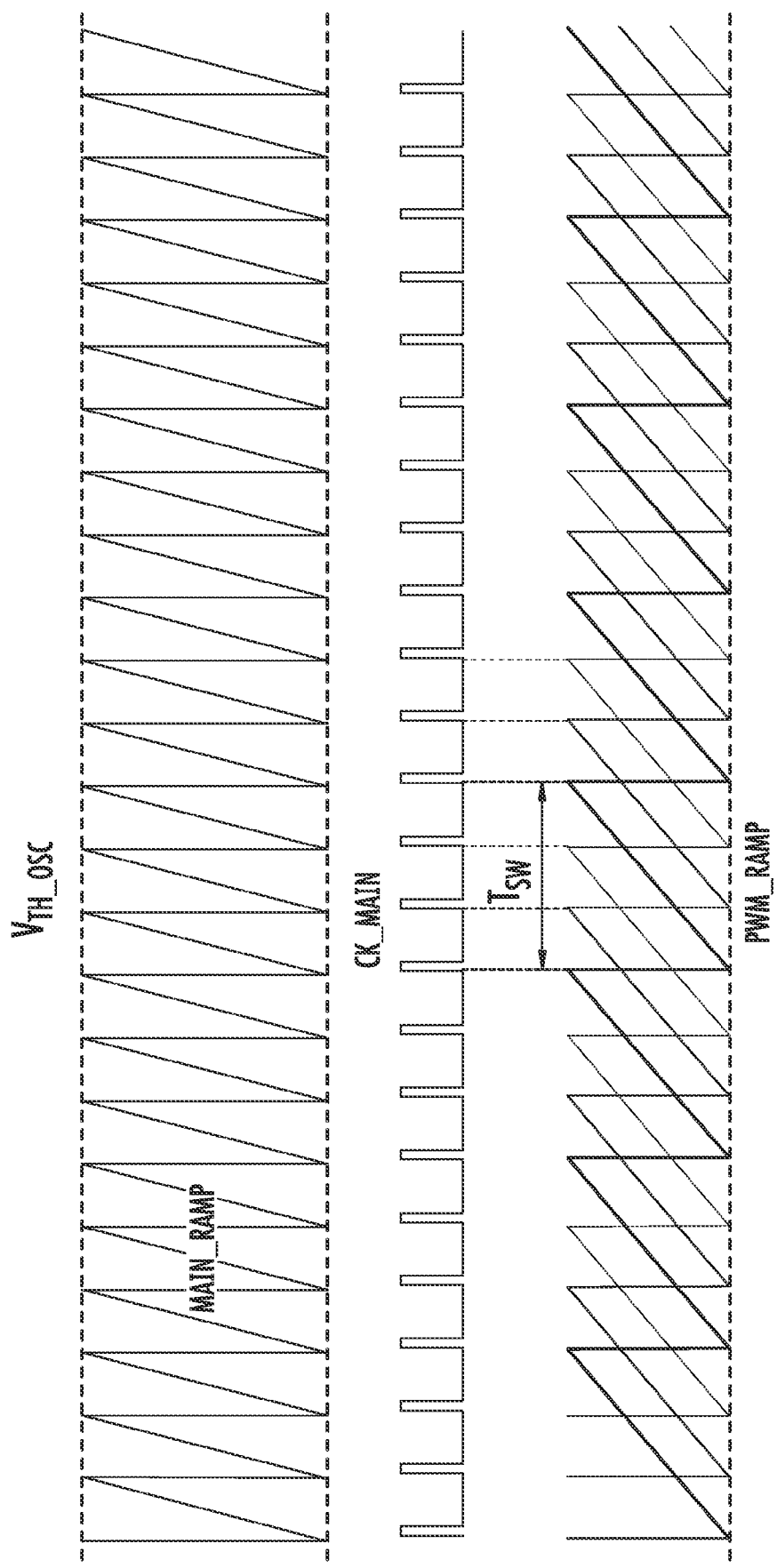
FIG. 14 is a time diagram that illustrates the relationships among the main signals of the circuit of FIG. 13 and the typical ramp signals used for generating the driving signals of the phase circuits of a three-phase PWM voltage converter.

For sake of illustration and providing an example, FIG. 14 illustrates how the clock signal CK_MAIN could be used for obtaining four PWM ramps useful for generating four uniformly outphased PWM driving signals of a four-phase voltage converter. The turn on sequence of the phase circuits could also be different from that depicted in figure, and the type of PWM ramp (in this case a saw-tooth) could be different from the illustrated one.

Figure 15:
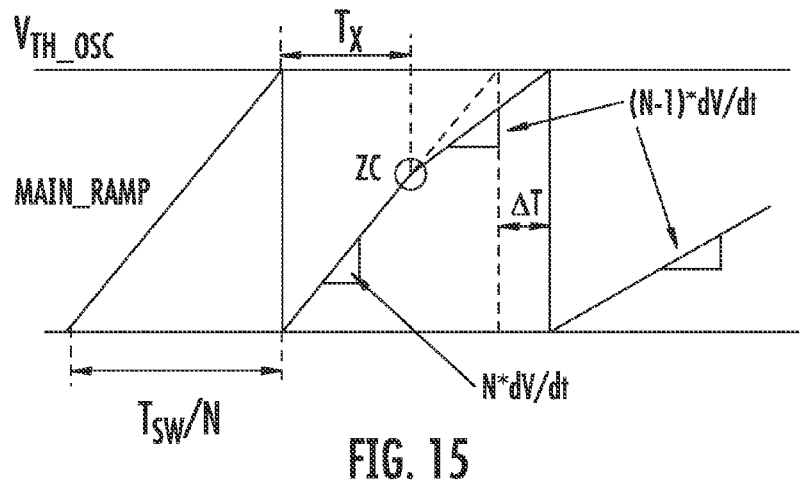
FIG. 15 illustrates in detail how the signal MAIN_RAMP of the circuit of FIG. 13 varies when a phase circuit of the converter is turned off (ZC event).

By generating the main ramp (MAIN_RAMP) using a current proportional to the number of active phases, a situation as that depicted in FIG. 15 occurs. The intervals $T_X$ and $\Delta T$ have already been described, dV/dt represents the slope of the ramp MAIN_RAMP when all the phase circuits but one are driven with a null duty-cycle, N represents the number of total phase circuits of the system and ZC is the instant at which a current of the phase circuit to be turned off reaches the turn off level. The following equations hold:

$$V_{TH\_OSC} = N \frac{dV}{dt} \frac{T_{SW}}{N}$$

from which $V_{TH\_OSC} = N \frac{dV}{dt} T_X + (N-1) \frac{dV}{dt} \left( \frac{T_{SW}}{N} - T_X + \Delta T \right)$ and thus $T_{SW} = N T_X + (N-1) \left( \frac{T_{SW}}{N} - T_X + \Delta T \right)$ $$\Delta T = \frac{1}{N(N-1)} T_{SW} - \frac{1}{N-1} T_X$$

The obtained $\Delta T$ value is the same that has been previously calculated for theoretically eliminating the output voltage drop.

Figure 16:
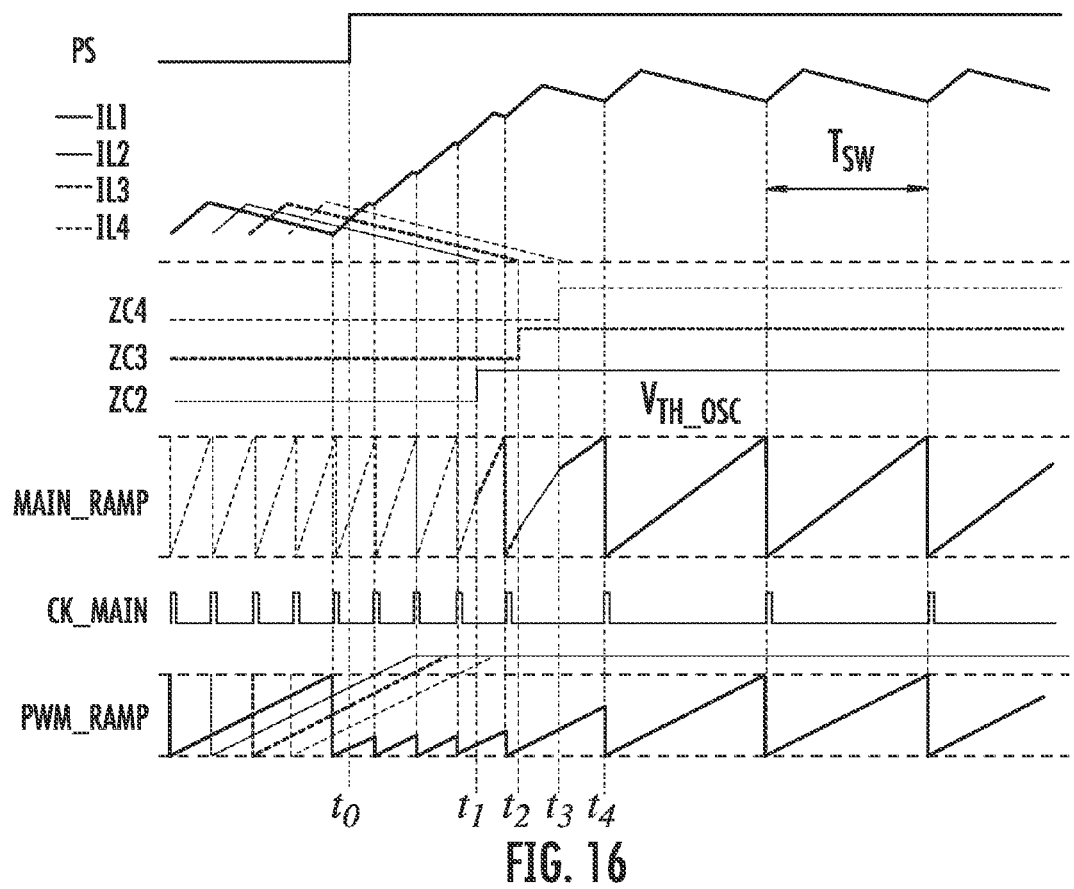
FIG. 16 is a graph of the waveforms of the phase currents in a four phase converter switched according to the method, according to the present disclosure, wherein at the same time the duty-cycle of three phase circuits to be turned off are nullified.

FIG. 16 illustrates how to turn off three phase circuits of a four phases voltage converter according to the method of the disclosure and how the clock signal with a variable period MAIN_RAMP is modified. When the signal PS switches high at the instant $t_0$, the phase circuits 2, 3 and 4 are driven with a null duty cycle and their phase currents diminish. In the interval from $t_0$ to $t_1$, since at each clock cycle there are still 4 phase circuits that contribute to the overall output current, the phase circuit 1 should be driven at a frequency and gain 4 times larger that the nominal values. By supposing constant the slope of the ramp PWM_RAMP used for generating the respective PWM driving signals, the gain increase is obtained simply by resetting the relative ramp to the phase circuit 1 at a larger frequency, in this case 4 times larger, thus keeping constant the relative turn on time.

At the instant $t_1$, the phase circuit 2 is set in a high impedance state and the relative zero-crossing signal $ZC_2$ switches high. The active phase circuits are three, i.e. the circuits 1, 3 and 4. When the zero-crossing signal $ZC_2$ of the phase circuit 2 switches high, the slope of the main ramp MAIN_RAMP varies as shown in the figure. At the instant $t_2$ also, the signal $ZC_3$ switches high and the active phase circuits become 2 in number, that is the phase circuits 1 and 4. In the interval from $t_2$ to $t_3$, the frequency of the phase 1 should become twice the nominal frequency, but, because of the assertion of the zero-crossing signal $ZC_4$ of the phase circuit 4, the period of the ramp of the main clock MAIN_RAMP is altered. From the instant $t_3$ onwards, the sole active phase circuit is the phase circuit 1. In the interval from $t_3$ to $t_4$, the system prolongs the times adaptively, and from $t_4$ onwards, the converter works with a single active phase circuit driven with a frequency and a gain equal to the nominal values.

The method may be generalized for carrying out transitions from a functioning condition with N active phase circuits to a functioning condition with only m active phase circuits. At the instant in which a transition command is given, the duty cycle of the driving signals of the phase circuits to be turned off is nullified and the turn off time of the driving signals of the phase circuits to be left active is reduced, such that the relative switching period be in times the original switching period divided by the number of phase circuits in which a current flows. As the phase circuits are turned off, the switching period is updated. It is to be noticed that the generator of FIG. 13 is adapted to generate a clock signal CK_MAIN for implementing this transition.

By using the proposed method, relatively fast transitions are executed. In some applications, this could be unacceptable because the increment of the switching frequency of the driving signal of the phase circuit to be left active could be excessive and could imply stresses of the power components or could lead to saturation of the control variable of the system because of the too large gain.

Figure 17:
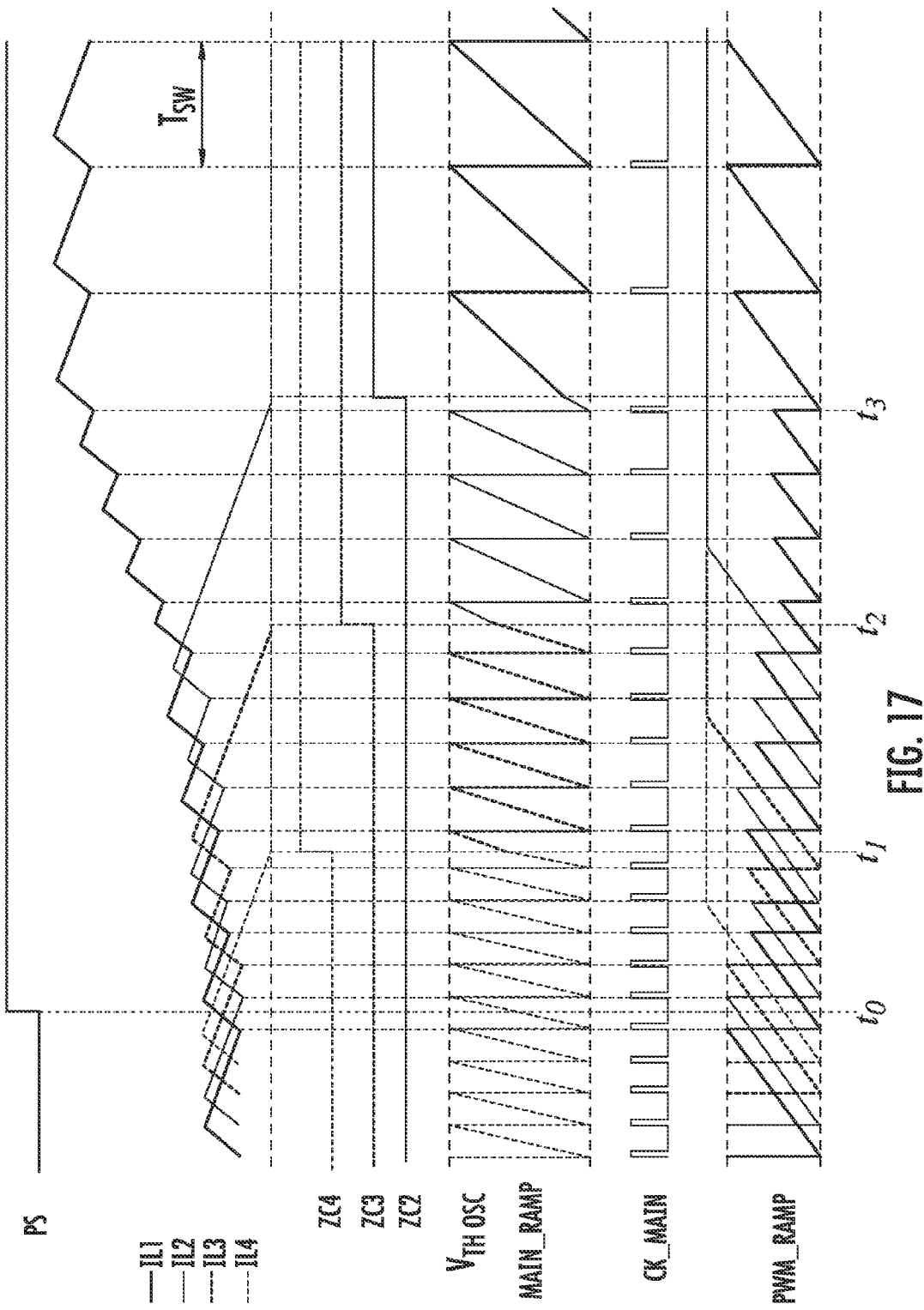
FIG. 17 is an exemplary time graph of the waveforms of the phase currents in a four-phase converter switched according to the method, according to the present disclosure, wherein the duty-cycles of three phase circuits to be turned off are sequentially nullified one at the time.

In order to obviate to this eventual limit, it is possible to carry out a smooth transition by turning off one phase circuit at the time, as shown in FIG. 17 in which a transition from four to one on phase circuits is illustrated. In view of the above considerations, the graph of FIG. 17 may appear immediately self-explaining to any skilled person.

Figure 18:
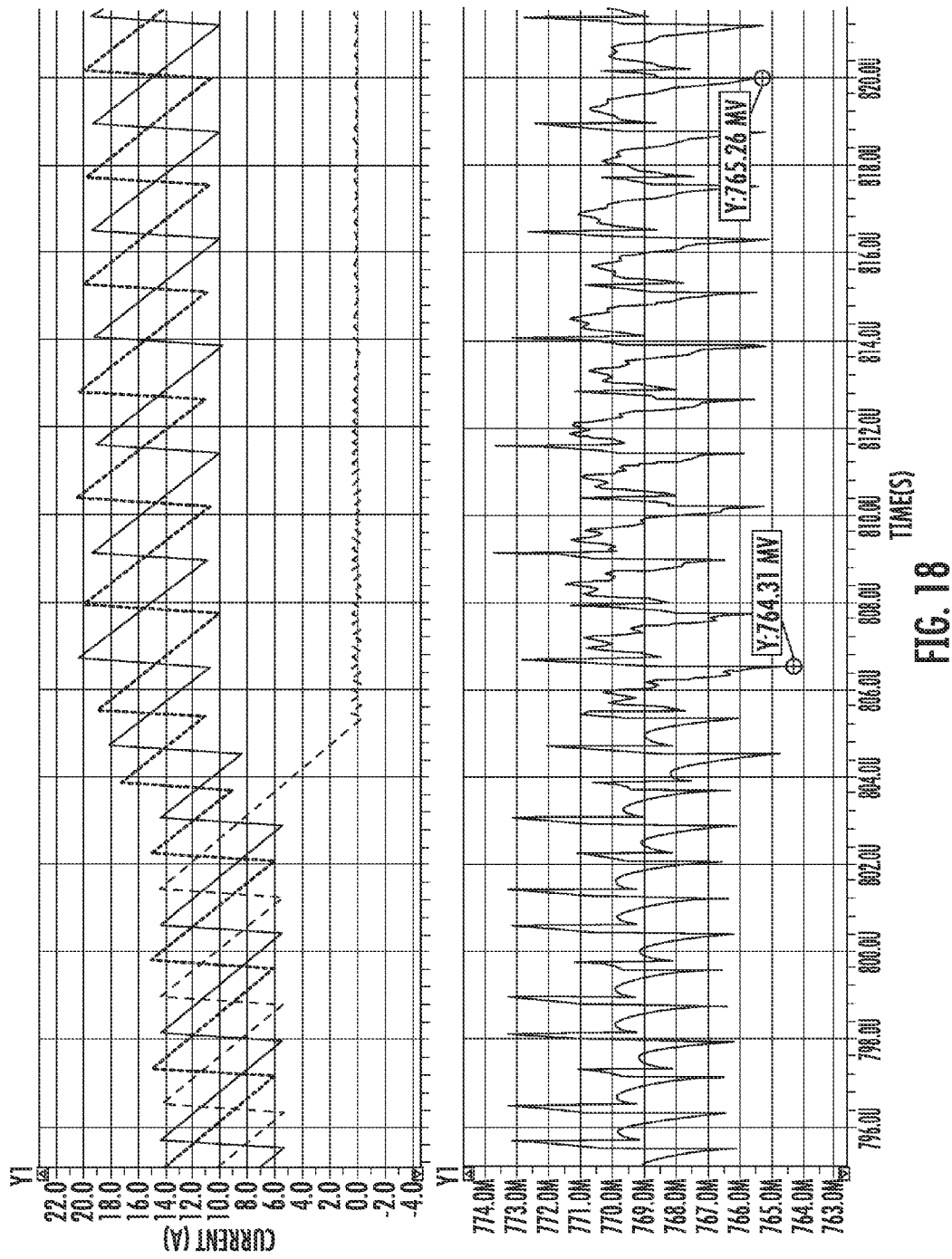
FIG. 18 depicts waveforms obtained through simulation of a switching from three to two active phase circuits carried out according to the method, according to the present disclosure.
Figure 19:
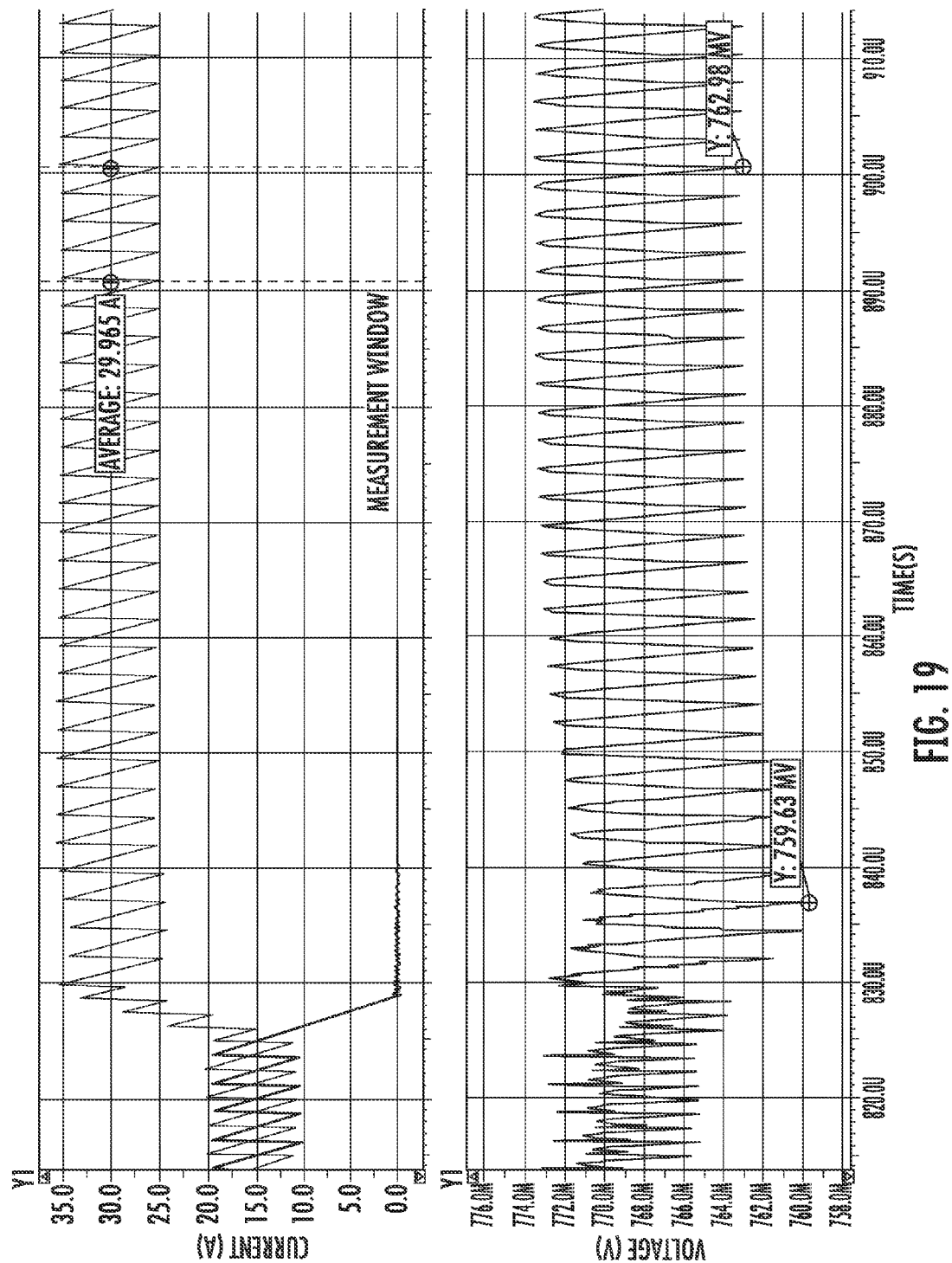
FIG. 19 depicts waveforms obtained through simulation of a switching from two active phase circuits to a single on phase circuit carried out according to the method, according to the present disclosure.

By carrying out the transition in this way, the frequency and the gain of the phase circuit 1 is limited to twice the nominal value and only for a short transition interval. Moreover, during transitions, the interleaving between the active phases is ensured such to reduce the input current (ms) and the switching noise of the whole system. FIGS. 18 and 19 show simulation results of a transition from three to two active phase circuits and from two to one active phase circuit, respectively. The output voltage drop Vout is not null because of parasitic components and second order effects, but it is negligible.

Figure 20:
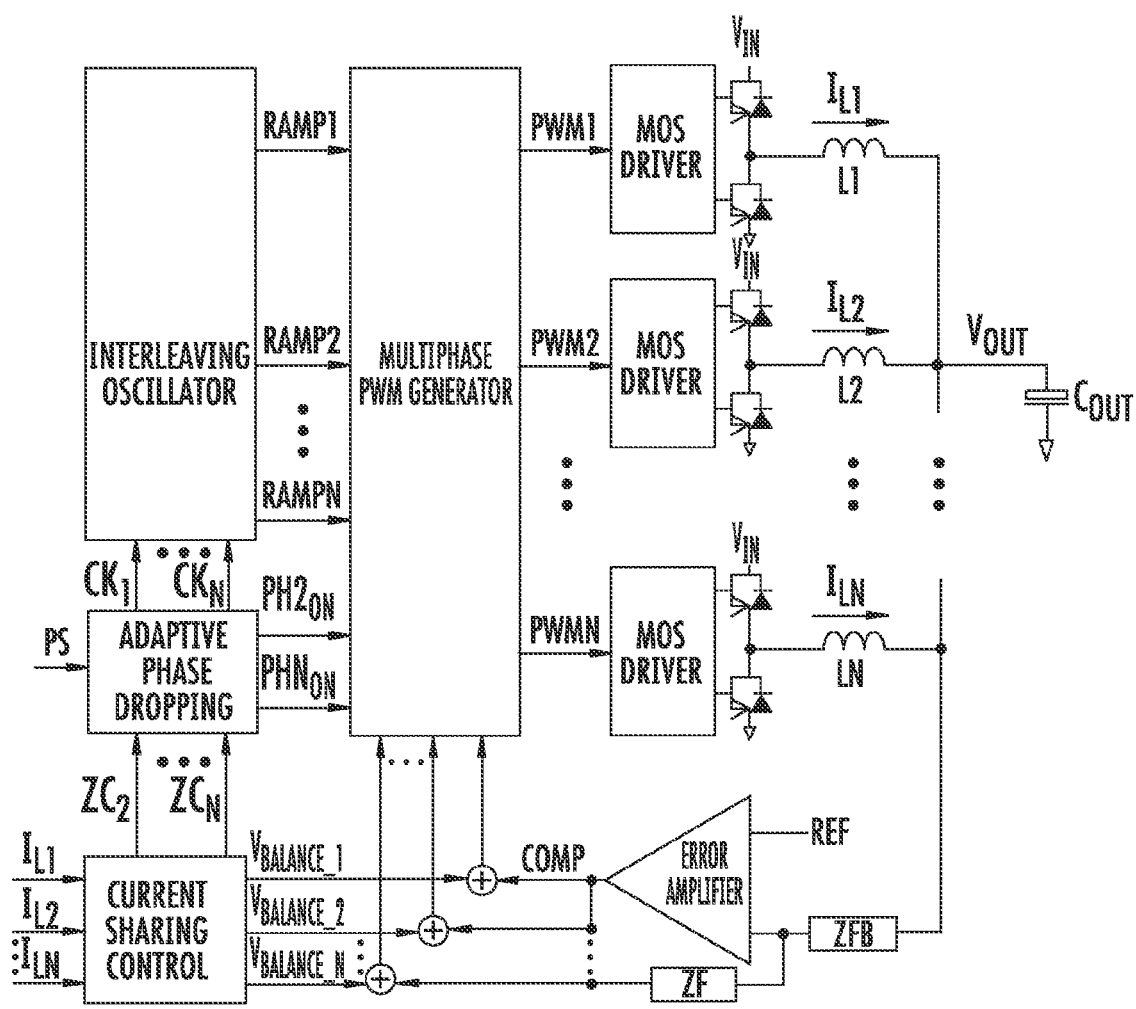
FIG. 20 is an exemplary block diagram of a multi-phase PWM buck voltage converter having a control circuit that generates clock signals with a variable period and drives the progressive switching off of the phase circuits of the converter, according to the present disclosure.

FIG. 20 is a block diagram of a voltage regulator having the circuit ADAPTIVE PHASE DROPPING that implements the method. $CK_1, \ldots, CK_N$ represent the reset signals of the respective ramps; $PH2_{ON}, \ldots, PHN_{ON}$ represent the signals for commanding the turning off (setting in a high impedance state) of the respective phase; $ZC_2, \ldots, ZC_N$ represent the zero-crossing signals of the currents of the respective phases; and PS represents the power saving logic signal with which the beginning of a transition is commanded.

That which is claimed is:

1. A method of switching a pulse width modulated (PWM) voltage converter from a first mode with N phase circuits being on to a second mode with m phase circuits being on and the other N-m phase circuits being off, the voltage converter being driven with PWM driving signals having an initial switching period, the method comprising:
   driving the N-m phase circuits to be turned off with PWM signals and turning off the N-m phase circuits based upon the current flowing therethrough being zero;
   setting a switching period of the m on phase circuits based upon a product between m and a ratio between the initial switching period and the number of phase circuits through which a current flows; and
   updating the switching period of the m on phase circuits based upon the N-m phase circuits being turned off.

2. The method of claim 1 wherein one phase circuit remains on.

3. The method of claim 1 further comprising setting in a high impedance state phase circuits to be turned off based upon the current flowing therethrough decreasing below a turn off level.

4. The method of claim 1 further comprising setting in a high impedance state phase circuits to be turned off based upon the current flowing therethrough being zero.

5. The method of claim 1 wherein the switching period of the on phase circuits is determined by a respective clock signal of variable period by at least:
   generating a signal representative of the number of phase circuits in which a current flows by sensing threshold current crossings in the phase circuits;
   using a current generator commanded by the signal representative of the number of phase circuits to generate a current proportional to the number of phase circuits through which a current flows;
   charging a tank capacitor with the current generator; and
   generating pulses of the clock signal by iteratively performing at least
      comparing a voltage on the tank capacitor with a threshold,
      generating the pulse of the clock signal when the threshold is attained, and
      discharging the tank capacitor.

6. The method of claim 5 wherein the current generator comprises an adjustable current generator.

7. A method of switching a pulse width modulated (PWM) voltage converter from a first mode with N phase circuits being on to a second mode with m phase circuits being on and the other N-m phase circuits being off, the voltage converter being driven with PWM driving signals having an initial switching period, the method comprising:
   driving the N-m phase circuits to be turned off with PWM signals and turning off the N-m phase circuits based upon the current flowing therethrough being zero;
   setting a switching period of the m on phase circuits based upon a product between m and a ratio between the initial switching period and the number of phase circuits through which a current flows;
   updating the switching period of the m on phase circuits based upon the N-m phase circuits being turned off; and
   setting in a high impedance state phase circuits to be turned off as the current flowing therethrough decreases below a turn off level.

8. The method of claim 7 wherein one phase circuit remains on.

9. The method of claim 7 further comprising setting in a high impedance state phase circuits to be turned off based upon the current flowing therethrough being zero.

10. The method of claim 7 wherein the switching period of the on phase circuits is determined by a respective clock signal of variable period by at least:
    generating a signal representative of the number of phase circuits in which a current flows by sensing threshold current crossings in the phase circuits;
    using a current generator commanded by the signal representative of the number of phase circuits to generate a current proportional to the number of phase circuits through which a current flows;
    charging a tank capacitor with the current generator; and
    generating pulses of the clock signal by iteratively performing at least
       comparing a voltage on the tank capacitor with a threshold,
       generating the pulse of the clock signal when the threshold is attained, and
       discharging the tank capacitor.

11. The method of claim 10 wherein the current generator comprises an adjustable current generator.

12. A circuit for generating a clock signal with a variable period based upon a ratio between an initial switching period and a number of phase circuits through which a current of a pulse width modulated (PWM) voltage converter flows, the circuit comprising:
    a current generator configured to be driven by a signal representing the number of phase circuits through which the current flows and to generate a current based thereon;
    a tank capacitor configured to be charged by said current generator;
    a comparator configured to compare a voltage on said tank capacitor with a threshold value and to generate a pulse of the clock signal based upon the threshold value being attained; and
    a discharge path coupled to said tank capacitor and configured to be enabled during the pulses of the clock signal.

13. The circuit of claim 12 wherein said current generator is configured to generate the current proportional to the number of phase circuits through which the current flows.

14. The circuit of claim 12 wherein said current generator comprises an adjustable current generator.

15. A pulse width modulated (PWM) voltage converter comprising:
    a plurality of phase circuits;
    a circuit for generating a clock signal with a variable period based upon a ratio between an initial switching period and a number of phase circuits through which a current of a pulse width modulated (PWM) voltage converter flows, the circuit comprising
    a current generator configured to be driven by a signal representing the number of phase circuits through which the current flows and to generate a current based thereon,
    a tank capacitor configured to be charged by said current generator,
    a comparator configured to compare a voltage on said tank capacitor with a threshold value and to generate a pulse of the clock signal based upon the threshold value being attained, and
    a discharge path coupled to said tank capacitor and configured to be enabled during the pulses of the clock signal; and
    a PWM driving signal generator configured to generate PWM driving signals based upon the clock signal.

16. The PWM voltage converter of claim 15 wherein said current generator is configured to generate the current proportional to the number of phase circuits through which the current flows.

17. The PWM voltage converter of claim 15 wherein said current generator comprises an adjustable current generator.

18. The PWM voltage converter of claim 13 further comprising:
    a plurality of MOS drivers to be coupled to said PWM driving signal generator; and
    an error amplifier coupled to said plurality of MOS drivers.

19. The PWM voltage converter of claim 18 wherein said error amplifier is configured to receive a reference voltage and an output of said plurality of plurality of MOS drivers.

* * * * *